United States Patent [19]

McColl

[11] 4,207,956
[45] Jun. 17, 1980

[54] APPARATUS FOR INDIVIDUALLY STEERING AND DRIVING VEHICLE WHEELS

[75] Inventor: Bruce J. McColl, Whitby, Canada

[73] Assignee: Owens-Illinois, Inc., Toledo, Ohio

[21] Appl. No.: 934,458

[22] Filed: Aug. 17, 1978

Related U.S. Application Data

[63] Continuation-in-part of Ser. No. 842,801, Oct. 17, 1977, Pat. No. 4,153,265.

[51] Int. Cl.² .............................................. B62D 61/10
[52] U.S. Cl. ..................................... 180/24; 180/242; 280/111
[58] Field of Search ............... 180/23, 24, 44 E, 44 F, 180/51, 52, 24.07, 24.08, 242, 264, 265, 266, 267; 280/111, 677, 682

[56] References Cited

U.S. PATENT DOCUMENTS

| 3,027,959 | 4/1962 | Mailliard | 180/23 |
| 3,244,249 | 4/1966 | Thomas | 180/14 B |
| 3,302,739 | 2/1967 | Beck et al. | 180/24 |
| 3,471,166 | 10/1969 | Clark | 180/23 X |
| 3,874,698 | 4/1975 | Lee et al. | 280/408 |

Primary Examiner—John A. Pekar
Attorney, Agent, or Firm—John R. Nelson; Myron E. Click; David H. Wilson

[57] ABSTRACT

This invention provides an apparatus for mounting, driving and steering the wheels of a high mobility wheeled vehicle, such as those used over roadless terrain in tree harvesting operations. Each vehicle wheel is mounted on a rotatable hub which is in turn journaled on the end of a wheel drive housing. The housing is medially pivoted to the wheel suspension structure of the vehicle for steering movements and has a driving motor mounted on the inner end of the housing and connected to the wheel hub through an appropriate gearing system. The pivotal mounting of the drive housing is preferably located at the end of a walking beam arm which is disposed at a substantial horizontal angle with respect to the longitudinal axis of the vehicle to provide clearance for steering movements of the vehicle wheel. The steering motion is imparted to the drive housing by an actuator which is connected between the inner end of the drive housing and the inner end of the walking beam arm.

8 Claims, 10 Drawing Figures

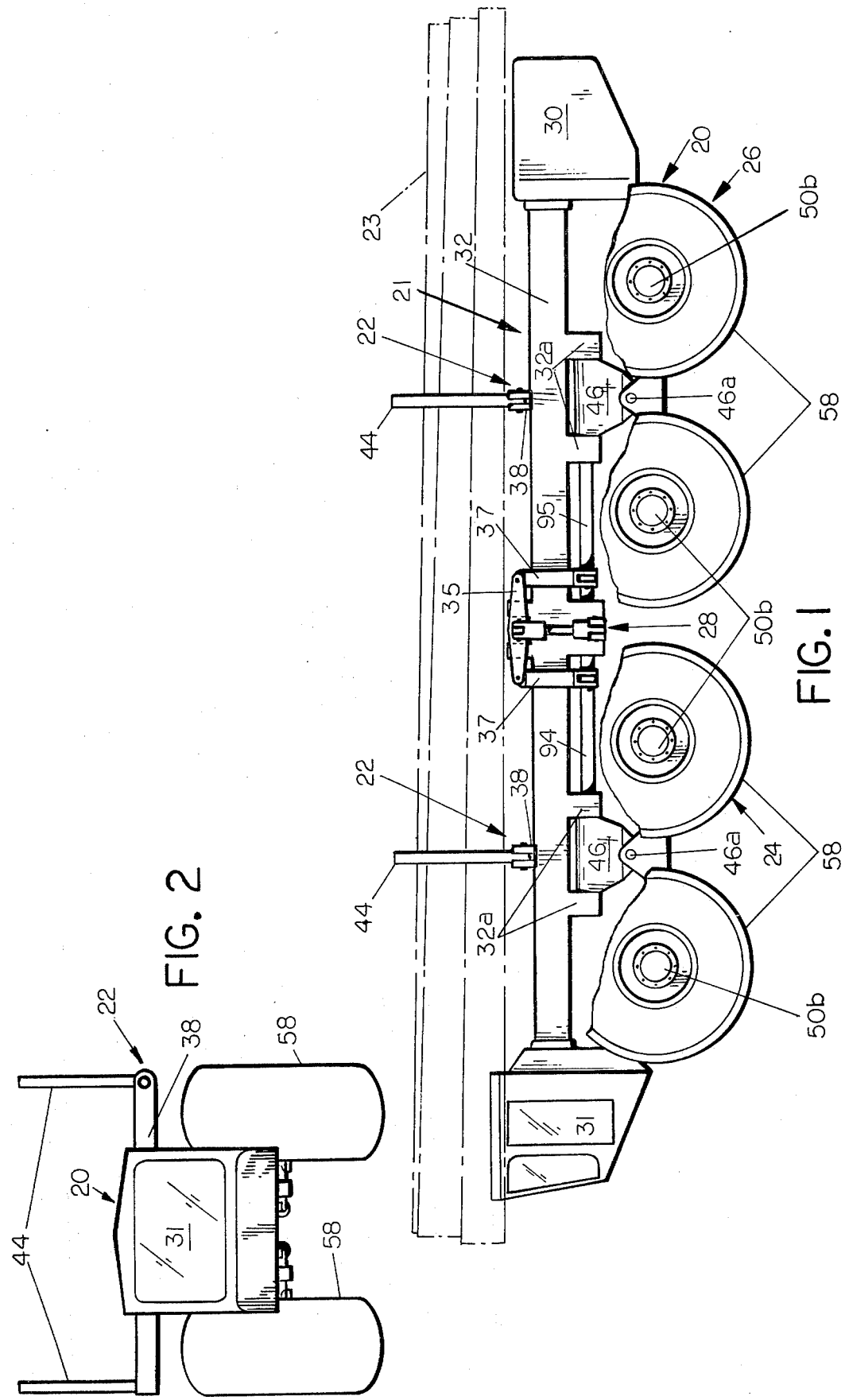

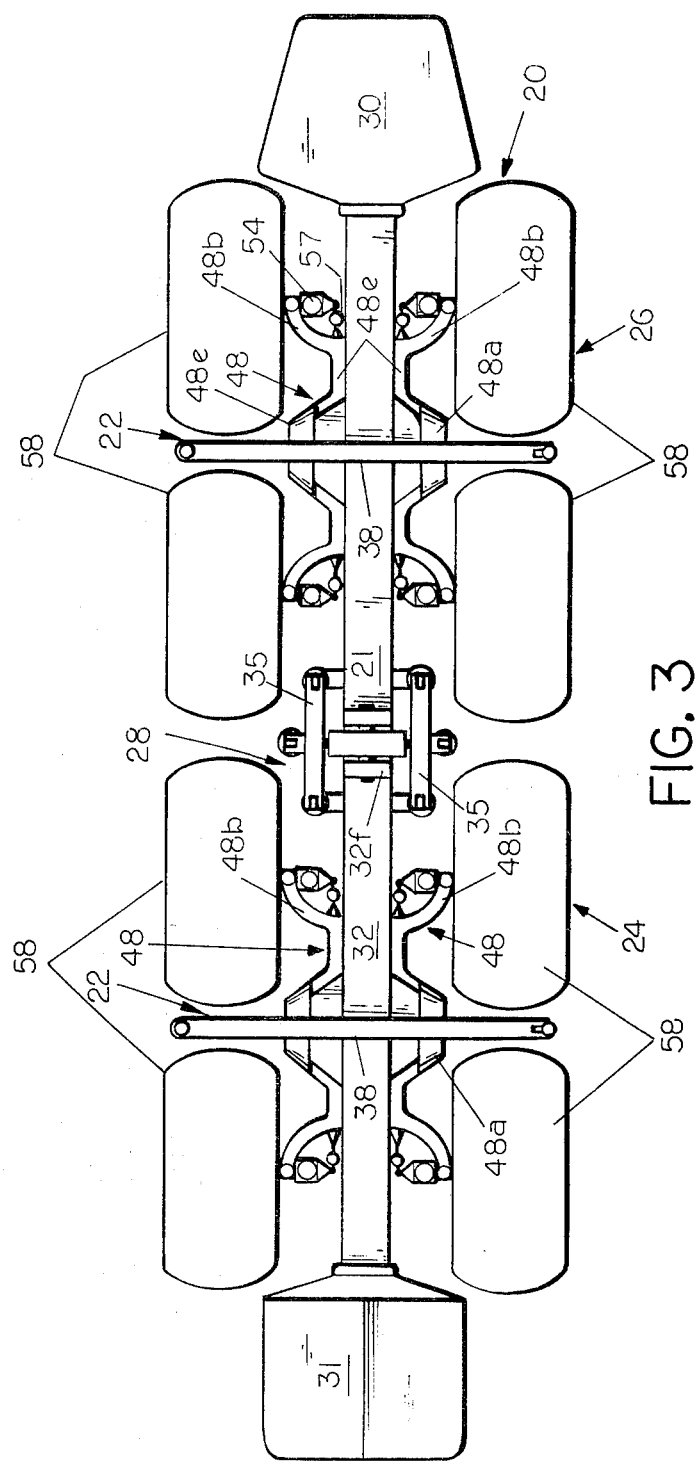

APPARATUS FOR INDIVIDUALLY STEERING AND DRIVING VEHICLE WHEELS

CROSS-REFERENCE TO RELATED APPLICATION

This application constitutes a continuation-in-part of my co-pending application Ser. No. 842,801, filed Oct. 17, 1977, now U.S. Pat. No. 4,153,265.

The wheel suspension mechanism of the off-road vehicle for which this invention is particularly suited is disclosed and claimed in my co-pending application Ser. No. 934,459, filed concurrently herewith.

The control circuit for such wheels is disclosed and claimed in my co-pending application Ser. No. 934,457, filed concurrently herewith.

SUMMARY OF THE INVENTION

Generally speaking, this invention relates to self propelled vehicles used primarily to transport long loads across roadless terrain. More specifically, it relates to rubber tired vehicles that have wheel suspension mechanisms which provide balanced weight between its wheels and additionally permits adjustment of the steady state position of the main bed frame of the vehicle relative to a longitudinal roll axis to permit compensation for the vehicle position when operating continuously on the side of a hill, and also to facilitate unloading the vehicle by a side dumping action in either direction.

In summary, the vehicle comprises an elongated bed frame that forms the backbone of the vehicle. This frame is balanced on the central portion of modular front and rear wheel assemblies, preferably each having four quadrilaterally spaced wheels. The quad wheel suspension system is designed to provide a freedom of movement of each wheel about mutually perpendicular roll and pitch axes that are vertically spaced one above the other. The quad wheel assemblies are pivotally mounted on the bed so as to be movable about a roll axis which is parallel to and beneath the longitudinal axis of the main frame element. On the lower or pitch axis of each quad wheel assembly, two walking beam members, each carrying a pair of steerable wheels, are rockably mounted in a balanced relationship. Thus the walking beams may rock about the pitch axis of the quad wheel asssembly while the quad wheel assembly itself may pivot about the roll axis.

A feature of this invention is the formation of each walking beam in the form of a truncated W-shape in a horizontal plane with a wheel mounted on each extreme end of the two outwardly angled arms of the W. The utilization of the W-shape provides adequate steering clearance for movements of the wheel, and in accordance with this invention, each wheel is supported by a drive housing which has its medial portion pivotally mounted to the ends of the W-shaped walking beam members. The drive housing carries a driving motor on its inner end and, on its outer end, a wheel mounting hub is rotatably journalled. Within the housing, suitable gearing is provided for connecting the driving motor to the wheel hub.

The steering movements of the wheel are imparted by an actuator which is connected between the inner end of the wheel drive housing and the base portion of the angled arm of the walking beam on which the individual wheel is mounted. Thus a triangular relationship is maintained between the end of the walking beam, the wheel drive housing, and the steering actuator.

The rotational speed, the braking, and the steering of each wheel is individually controlled in accordance with the method and apparatus disclosed and claimed in my aforementioned co-pending application, Ser. No. 934,457. A vehicle equipped with this combination of features has numerous advantages over prior art road vehicles. The individual control of the velocity and the turning angle of each wheel permits the vehicle to be manipulated through any selected one of a plurality of unusual movements or attitudes most of which are completely incapable of accomplishment by any vehicle equipped with conventional driving and steering mechanisms.

Other advantages and objects will become more apparent when the following description is read with reference to the accompanying drawings.

BRIEF DESCRIPTION OF DRAWINGS

FIG. 1 is a side elevational view of a complete vehicle embodying the wheel suspension mechanism of this invention.

FIG. 2 is a front elevational view of the vehicle of FIG. 1.

FIG. 3 is a plan view of the vehicle of FIG. 1.

DETAILED DESCRIPTION OF INVENTION

Figure 4:
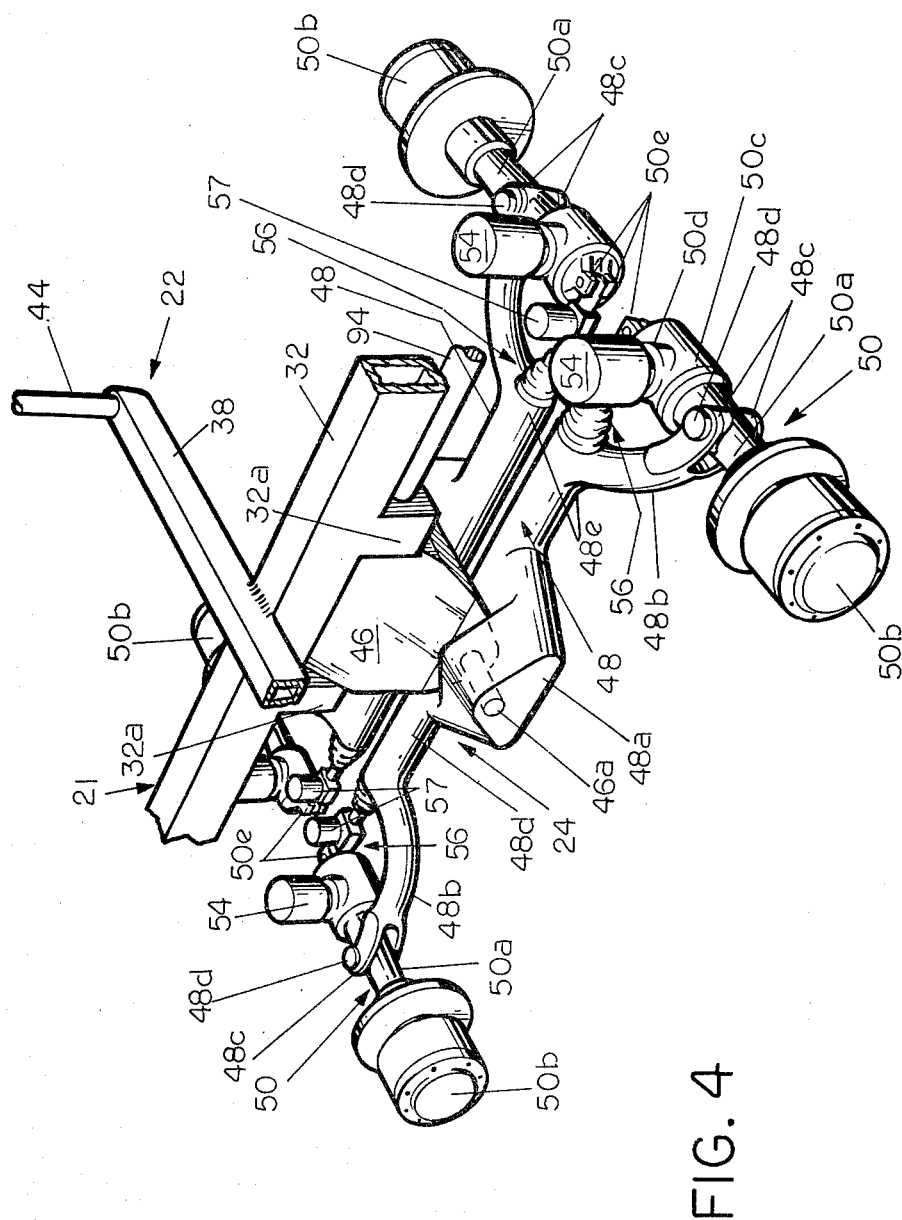
FIG. 4 is an enlarged partial perspective view of the suspension mechanism for the quad wheel assemblies utilized in the vehicle of FIG. 1.

The vehicle illustrated in the drawings is a transportation vehicle such as one used for forwarding tree lengths from a harvesting area is a forest to a landing adjacent to a road. Referring particularily to FIGS. 1–3 of the drawings, it will be seen that the vehicle 20 is comprised of an elongated bed frame assembly 21 including load-carrying cradle assemblies 22 adapted to carry a plurality of tree lengths 23. Front and rear quad wheel assemblies 24, 26 are respectively attached to the bed frame assembly 21 by journals so as to be pivotally movable about a longitudinal roll axis disposed parallel to and beneath the bed frame assembly 21. A roll control linkage means 28 interconnects the quad wheel assemblies with each other and with the elongated bed frame assembly so as to control their relative positions during operation over rough terrain. Preferably an engine unit 30 is located at the rear end of the vehicle, and an operator's cab 31 is located at the front end.

The illustrated bed frame assembly 21 comprises an elongated bed frame element 32 extending lengthwise along the center line of the assembly. The bed frame 32 which serves as the backbone of the vehicle may be a rectangular tube. A plurality of rigid bed cross beams 38 extend laterally outwardly from the bed frame structure in both directions to form the load-carrying cradles 22. Upright side stakes 44 may be provided on the outer ends of the cross beams. The stakes, along one or both sides, may be releasably mounted to permit sidewise dumping of the load on either side by appropriately tilting the bed frame assembly 21 about the roll axis of the wheel suspension assemblies.

In the drawings it will be noted that the front and rear quad wheel assemblies 24, 26 are substantially identical to one another, so for the sake of brevity, the similar portions will be described with respect to one of them only. Accordingly, attention is directed to FIG. 4 of the drawings wherein the details of the front squad wheel assembly 24 are illustrated.

The suspension system for the front quad wheel assembly includes a main pivot block 46 which is pivotally suspended beneath the tubular bed frame 32 between a pair of depending blocks 32a, thus providing pivotal movement about a longitudinal horizontal roll axis which is parallel to and slightly below the axis of the tubular bedframe 32. Such pivotal mounting is not shown but is entirely conventional. A torque transmission tube 94 extends rearwardly from the main pivot block 46 and is co-movable therewith about the vehicle roll axis. A similar tube 95 extends forwardly from the rear quad wheel assembly and the adjacent ends of tubes 94 and 95 are respectively interconnected by a roll control linkage mechanism 28 to be hereinafter described.

The bottom portion of main pivot block 46 is provided with a pair of laterally projecting horizontal pivot pins 46a which respectively provide pivotal mounting for a pair of walking beams 48 which are of identical configuration except that they are mounted in reversed positions on the pivot pins 46a. Each walking beam 48 is of a generally truncated W-shaped configuration in plan view including a central truncated inverted V-shaped portion 48a defining the bearing for the pivotal mounting on pin 46a and identical angularly disposed arcuate end elements 48b which provide mountings for steerable wheel units 58 of the squad wheel assemblies. The horizontal angle of elements 48b determines the maximum wheel turning angle. The ends of arm portions 48b are bifuracated as indicated at 48c and the bifurcated ends are traversed by a vertical pivot unit 48d which pivotally supports a central cylindrical portion 50a of a wheel spindle housing 50. At its outer end, the spindle housing 50 terminates in a power driven cylindrical hub 50b to which a wheel 58 is rigidly secured in conventional fashion. The inner end of housing 50 defines a gear chamber 50c plus a mounting flange 50d for mounting an electrically or hydraulically driven reversible motor 54 by which the wheel 58 is driven. The gearing mechanism interconnecting the reversible motor 54 with the wheel hub 50b may be entirely conventional and will be described later. The extreme inner end of wheel spindle or drive housing 50 is provided with a pair of bifurcated lugs 50e which pivotally mount the apertured end of a steering actuator 56. The other end of actuator 56 is pivotally mounted to the bottom portion 48e of the truncated W-shaped walking beam 48. While actuator 56 may be hydraulically operated, I prefer to employ an electrically driven actuator and hence an actuator motor 57 is mounted on the actuator 56 and effects the extension or retraction of actuator 56 to in turn effect a steering motion of the associated wheel 58.

Within housing 50, a suitable power actuated brake (described later) is also provided.

From the description thus far, it should be apparent that the steering movements of the wheels 58 about the respective steering pin units 48d involve a much larger turning radius (on the order of two to four feet) than is customarily employed in wheeled vehicles. As is described in my aforementioned co-pending application, Ser. No. 934,457, this large turning radius is of significant advantage in effecting a lateral bodily displacement of the entire vehicle through the combination of limited steering, braking and rotational movements of the wheels in a selected sequence. Obviously, both the wheel driving motors 54 and the steering actuator motors 57 must have sufficient power to effect the desired rotation of the wheels and steering of the wheels under the very adverse conditions encountered in off-road operations. Such power may be supplied from a generator (not shown) driven by engine 30.

As previously mentioned, the details of the controls for the rotation, braking and turning of each wheel are described and claimed in my aforementioned co-pending application, Ser. No. 934,457.

From the description thus far, it is also apparent that each quad wheel assembly 24, 26 is suspended relative to the main bed frame element 32 in such fashion that the bed frame may pivot relative to the quad wheel assemblies about a roll axis which is parallel to and slightly beneath the main bed frame element 32. Concurrently, the wheels on each side of the quad wheel assembly may freely move in a vertical plane about a transverse horizontal pivot axis defined by the walking beam pivot pin 46a. Moreover, due to the "W" shape of each walking beam 48, steering movements of each of the wheels up to a thirty degree (30°) angle may be accomplished in either direction without interference with the suspension, the main frame or load carrying cradles of the vehicle.

The relative angular movement of the quad wheel assemblies 24, 26 with respect to each other and to the elongated bed frame assembly 21 is regulated by a roll control linkage 28, centrally located on the vehicle, that causes equal loading to be imposed on each quad wheel assembly, and also causes the bed frame assembly to be rotated proportionately, preferably one half the total angular displacement between the front and rear quad wheel assemblies, as exists at any one time. Angular displacement between the quad wheel assemblies relative to the roll axis obviously occurs during operation on uneven terrain or over boulders. The ground under the front quad wheel assembly may be laterally and possibly oppositely inclined to the ground under the rear quad wheel assembly, such as might occur while the vehicle is traversing a ditch at an angle.

Figure 5:
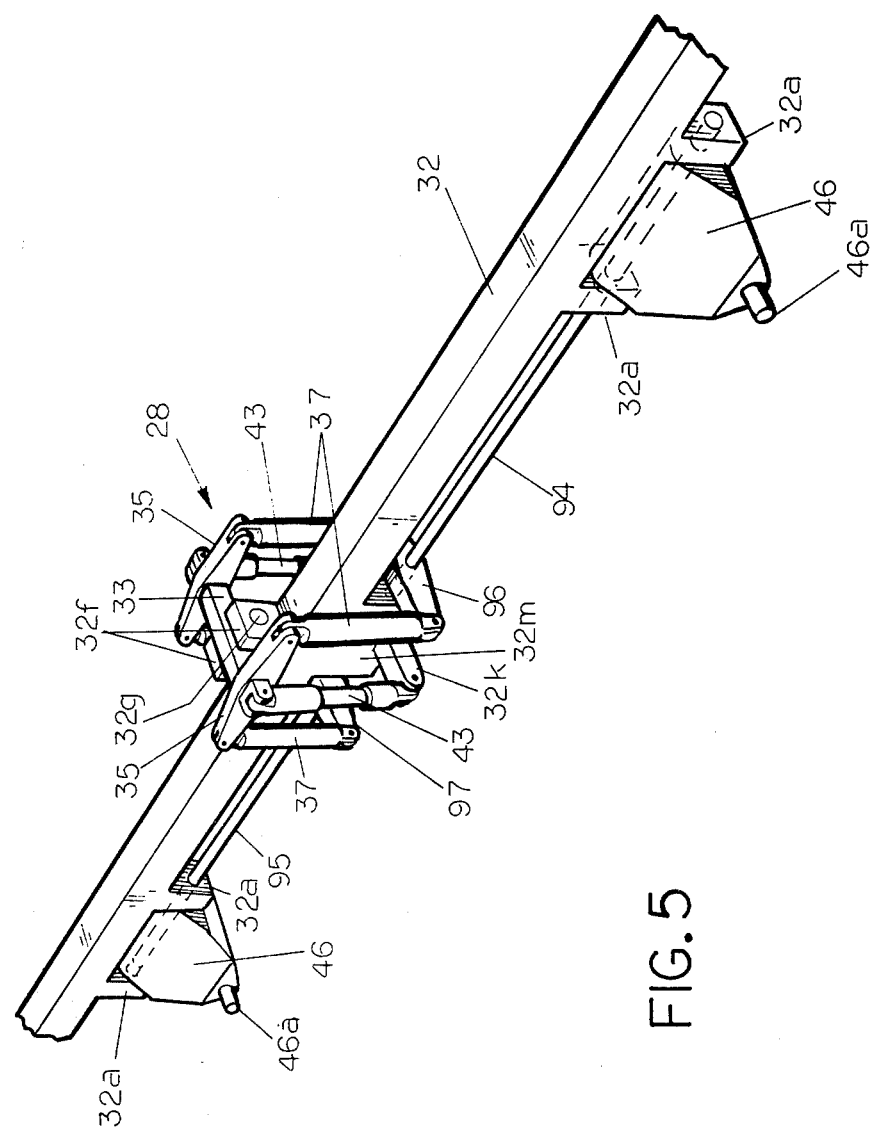
FIG. 5 is an enlarged partial perspective view illustrating the roll control linkage for the wheel suspensions incorporated in the vehicle of FIG. 1.
Figure 6:
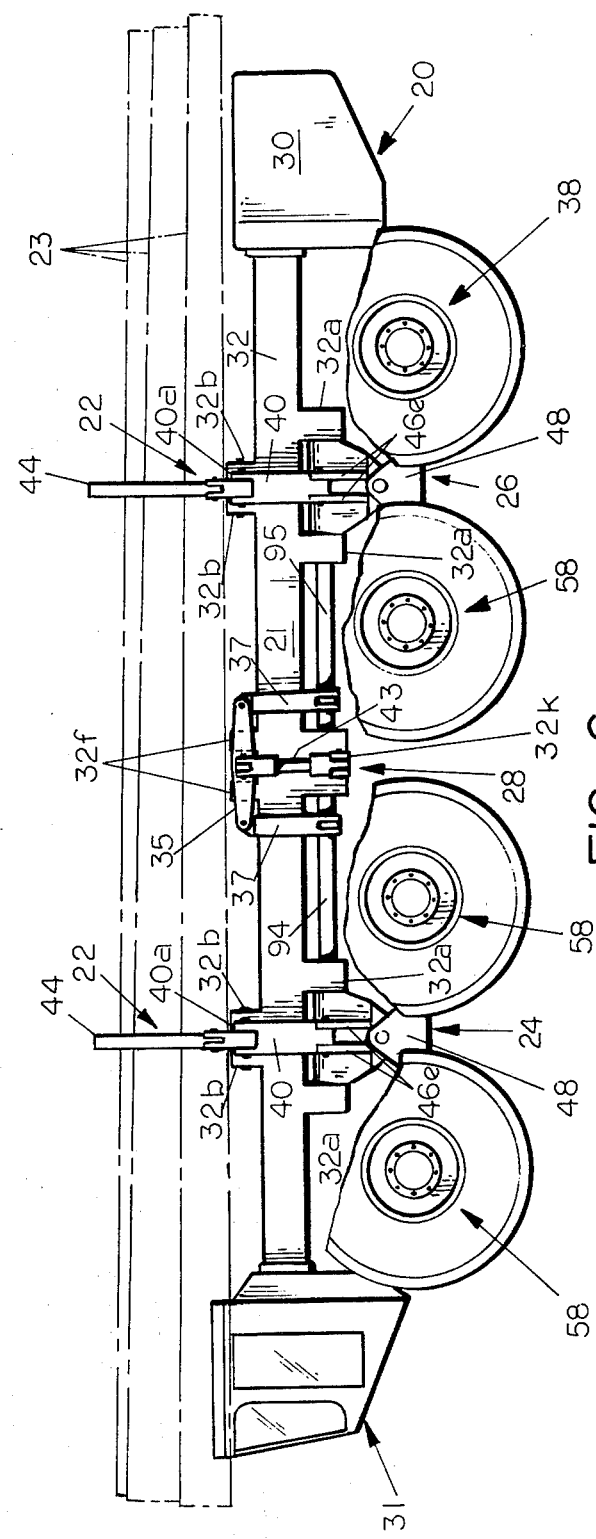
FIG. 6 is a side elevational view, similar to FIG. 1, of a vehicle incorporating a modified suspension mechanism.
Figure 7:
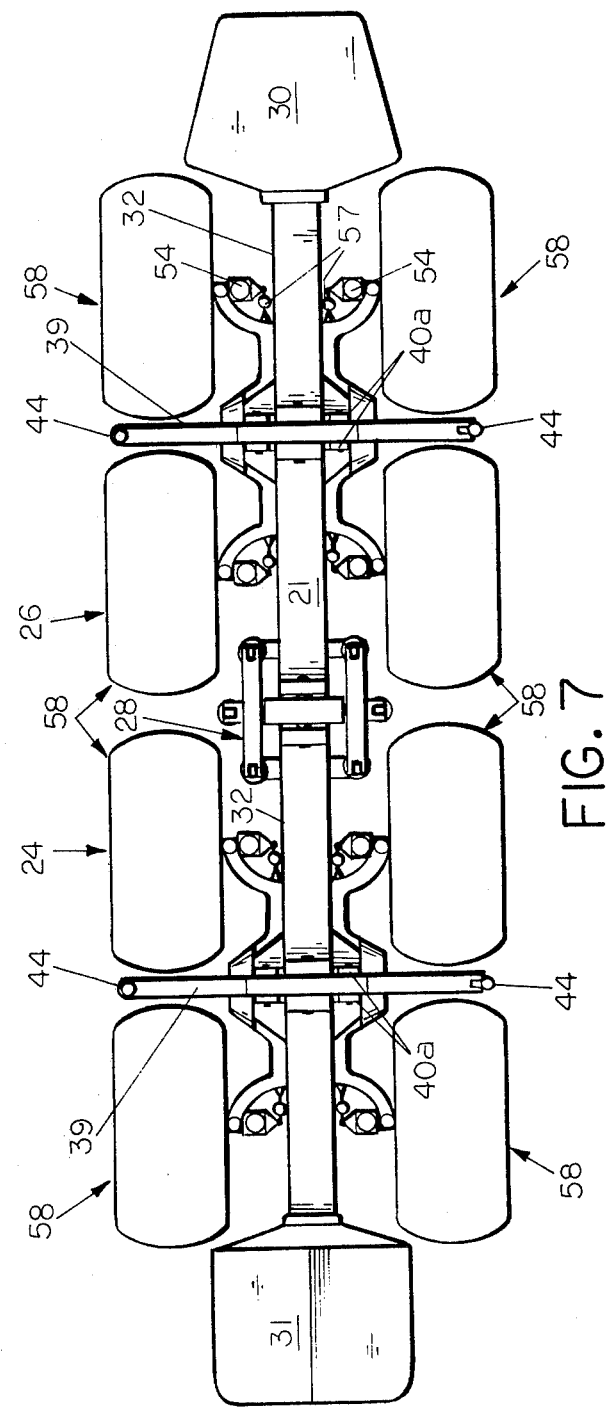
FIG. 7 is a plan view of FIG. 6.
Figure 8:
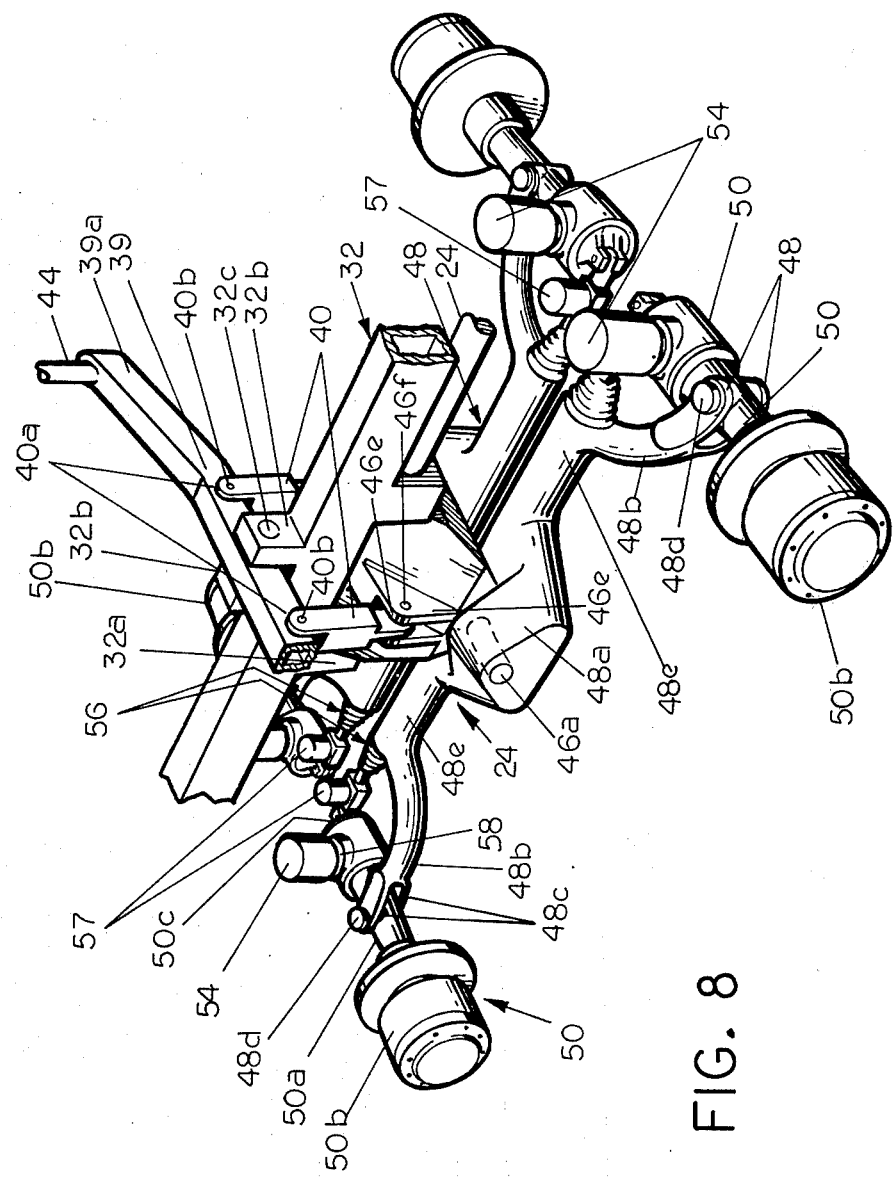
FIG. 8 is an enlarged partial perspective view of the quad wheel suspension system incorporated in the vehicle of FIG. 6.

Referring now to FIG. 5, the roll control linkage 28 will be described in greater detail. The rearward end of torque tube 94 and the forward end of torque tube 95 are suitably journaled in a depending frame block 32m and are disposed in spaced co-axially aligned relationship approximately in the center of the elongated frame member 32. Immediately above and between the ends of the torque tubes 94, 95, the base member 32 is provided with a pair of upstanding pivot ears 32f which support a pivot pin 32g which traverses the center portion of a transverse frame tilt lever 33. On each end of frame tilt lever 33 a longitudinal connecting lever 35 is mounted for pivotal movement about a horizontal axis. Additionally, on each end of torque tubes 94 and 95 there are respectively rigidly secured primary transverse actuating levers 96 and 97 and the ends of these levers are in general vertical alignment respectively with the ends of the connecting levers 35. A plurality of links 37 are provided respectively having their ends connected by a universal joint connection to the aligned ends of primary levers 96 and 97 and the connecting levers 35. Thus, any pivotal movement of one of the quad wheel assemblies 24, 26 relative to the other will result in a pivoting movement of the associated primary lever 96, 97 which in turn effects a tilting movement of the main tilt control lever 33 to shift the position of the main frame 32 approximately one half the amount of pivotal displacement of the quad wheel assembly relative to the roll axis. Thus a very effective control of the movements of the main frame about the roll axis in response to much larger movements of the quad wheel assemblies is achieved and, in effect, the pivoted lever connection control means 28 provides for balancing the effects of rotations of the two quad wheel assemblies in opposite directions about the roll axis on the main frame assembly.

Concurrently the roll control linkage effects a transfer of forces between the two quad wheel assemblies to equalize the loading thereof during movements about the roll axis.

The modification of this invention heretofore described is particularly useful in the hauling of trimmed lengths of trees having a total length in excess of 60 feet. In some woodland operations, particularly as practiced in Canada, it is more desirable to employ an off-road vehicle for bringing out loads of fresh cut whole trees. A load of this type does permit some angular shifting of the load supporting cradles as the transporting vehicle navigates difficult terrain areas.

Referring now to FIGS. 6, 7, 8 and 9, there is shown a modification of this invention wherein the load supporting cradles 22 are not rigidly secured to the elongated tubular frame element 32, but instead comprise a transverse beam 39, which is pivotally mounted to the top surface of the tubular bed frame 32. Such pivotal mounting is provided by a pair of upstanding ears 32b and a pivot pin 32c which traverses the cross-beam 39. Each cross-beam 39 is effectively secured for co-movement with the main pivot block 46 of the quad wheel assembly by a pair of parallel links 40, each of which has a bifurcated end 40a, pivotally connected by a transverse pin 40b to the cross-beam 39, and the other end 40c pivotally connected between a pair of bifurcated ears 46e provided on the main pivot block 46 and traversed by a pivot pin 46f.

Figure 9:
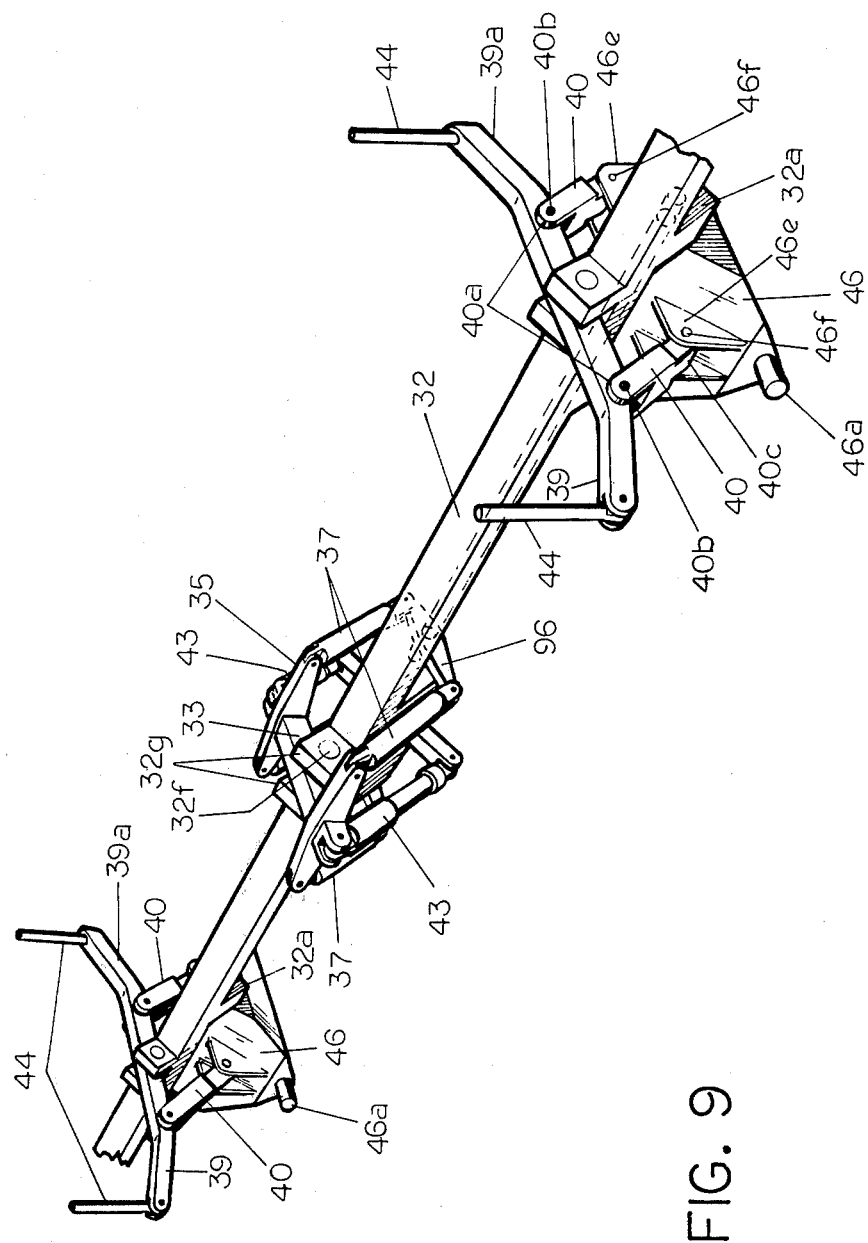
FIG. 9 is a partial perspective view illustrating a selected static position of the wheel supporting cradles and frame of the vehicle for continuous operation along a hillside.

It may be desirable to form the load supporting beams 39 with the outer ends inclined upwardly as shown at 39a in FIG. 9, in order to provide additional clearance for the quad wheel assembly. The important thing is that as each quad wheel assembly moves about the roll axis to traverse the terrain, a corresponding pivotal movement of the load supporting cradles is imparted by virtue of the parallelogram linkage connection of the cross-beams 39 to the main pivot block 46. At the same time, the roll control linkage 28 is still operative to effectively balance out oppositely directed inclinations of the front and rear quad wheel assemblies and thus reduce to a minimum the pivotal movements of the tubular bed frame 32 about the roll axis.

The advantage of this construction is a significant reduction in the height of the load carrying cradles relative to the main frame, hence lowering the center of gravity of the load.

A further feature of the suspension is the addition to the roll control lever assemblage 28 of a pair of power actuated stabilizing links which permit the operator to adjust the static position of the tubular main frame 32 relative to the roll axis. Referring to FIG. 5, such links may comprise the power actuated extensible elements 43 which are respectively connected between the extreme ends of the tilt control lever 33 and a bifurcated end of lateral projection 32k, formed on a depending block 32m, provided on the underside of the tubular bed frame 32. As the one stabilizing link 43 is extended by the application of either hydraulic or electric power thereto, the other link 43 is retracted so that the net effect is as illustrated in FIG. 9, in that the load supporting cradles or cross-beams 39 are shifted laterally and angularly with respect to the roll axis. Thus, the load may be maintained in a substantially horizontal position, even though the vehicle is being operated continuously on a hillside. The capability for adjusting the static angular position of the load carrying cradles relative to the roll axis provides additional stability to the vehicle and hence permits larger loads to be safely carried along a relatively steep hillside.

An extreme extension of either link 43 can effect the dumping of the load on a selected side of the vehicle.

Figure 10:
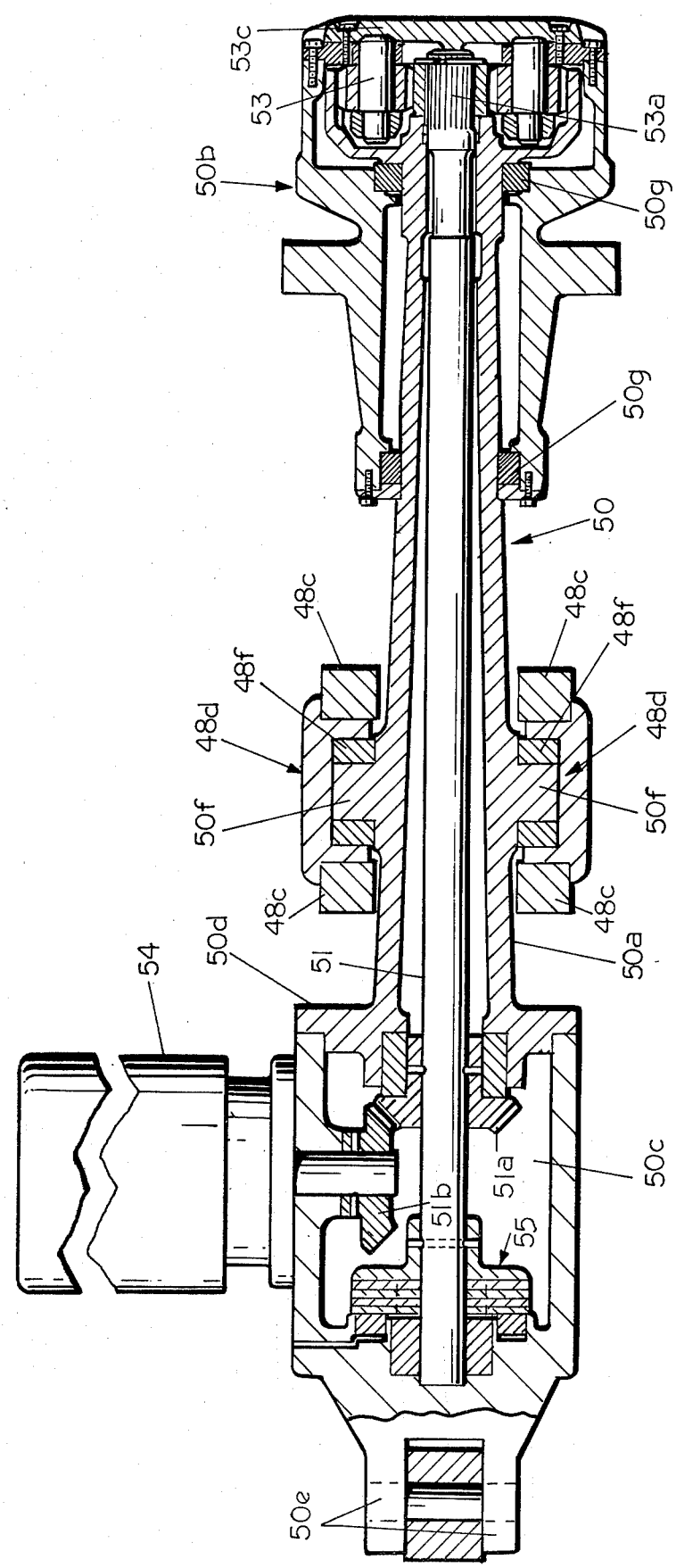
FIG. 10 is an enlarged scale sectional view taken on the plane 10—10 of FIG. 4.

Referring particularly to FIG. 10, it wll be seen that the wheel drive housing 50 journals a central shaft 51 which extends through the full length of the hollow housing 50. Shaft 51 is driven by motor 54 through a set of co-operating bevel gears 51a and 51b. The outer end of shaft 51 drives the sun gear 53a of a planetary gear unit 53 and the wheel hub 50b is secured to the planet gear support ring 53c. Wheel hub 50b is suitably journaled on the housing 50 by bearings 50g.

A conventional disc type brake 55 is provided on the inner end of shaft 51 and is controlled by suitable hydraulic or electric actuator (not shown).

The pivot unit 48d by which the wheel drive housing 50 is pivotally mounted to the bifurcated ends 48c of the walking beams is also illustrated in detail in FIG. 10. The housing 50 is provided with a pair of diametrically disposed cylindrical projections 50f which are respectively journaled in bearings 48f provided in a hollow cup-shaped supports 48d which are respectively journaled in the bifurcated ends 48c of the walking beam 48.

Modifications of the preferred embodiments of this invention herein described and illustrated will be apparent to those skilled in the art and it is intended that the scope of the invention be determined solely by the appended claims.

I claim:

1. In a self propelled wheel supported vehicle adapted for use over roadless terrain comprising in combination, an elongated bed frame, a wheel suspension structure pivotally secured to said bed frame for movement in a transverse vertical plane about a longitudinal roll axis, a wheel support beam pivotally mounted on said suspension structure for movement in a vertical plane about an axis transverse to said bed frame, said wheel support beam having a base portion defining said pivotal mounting and an arm portion extending angularly outwardly therefrom, (a) an elongated wheel drive housing, means on the outer end of said arm portion for pivotally mounting the medial portion of said wheel drive housing for steering movements, means on said housing for supporting a wheel driving motor, a wheel hub rotatably mounted on the outer end of said drive housing, means within said housing connecting said hub and said drive motor, and a power actuated extensible and retractable link pivotally connected at one end to the inner end of said wheel drive housing and at the other end of said base portion of said wheel support beam, whereby the application of power to said link controls the steering position of a wheel secured to said hub.

2. The combination defined in claim 1 wherein said wheel driving motor is disposed on the top portion of the inner end of said wheel drive housing.

3. The combination defined in claim 2 wherein said connecting means comprises a shaft extending through said housing, bevel gears connecting said motor to said shaft and planetary gear means connecting said shaft and said wheel hub.

4. In a self propelled vehicle adapted for use over roadless terrain having an elongated bed frame, a quad wheel assembly for supporting a portion of said bed frame comprising:
(1) a primary pivot structure adapted for mounting on said bed frame for pivotal movement about a horizontal roll axis parallel to said bed frame;
(2) a pair of walking beams respectively pivotally secured to the lateral sides of said pivot structure for movement in a vertical plane about a transverse axis, each said walking beam being generally truncated W-shaped in a horizontal plane with the pivotal mounting axis passing through the truncated center portion of the W-shape;
(3) means on each of each W-shaped walking beam for respectively pivotally mounting the medial portion of (a) an elongated wheel drive housing for steering movements;
(4) means on said housing supporting a wheel driving motor, the outer end of said housing rotatably supporting a wheel hub driven by said motor, and means connecting said motor and said hub, and
(5) a power actuated extensible and retractable link pivotally connected at one end to the inner end of said wheel drive housing and at the other end to the truncated center portion of the respective truncated W-shaped walking beam, whereby the application of power to said link controls the steering position of a wheel secured to said wheel hub.

5. The combination defined in claim 4 wherein said wheel driving motor is disposed on the top portion of the inner end of said wheel drive housing.

6. The combination defined in claim 5 wherein said connecting means comprises a shaft extending through said housing, bevel gears connecting said motor to said shaft and planetary gear means connecting said shaft and said wheel hub.

7. In a self-propelled, wheel supported vehicle adapted for use over roadless terrain comprising, in combination, an elongated bed frame, a wheel suspension structure pivotally secured to said bed frame for movement in a transverse vertical plane about a longitudinal roll axis, a wheel support beam pivotally mounted on said suspension structure for movement in a vertical plane about an axis transverse to said bed frame, said wheel support beam having a base portion defining said pivotal mounting an arm portion extending angularly outwardly therefrom, and elongated wheel drive housing, means on the outer end of said arm portion for pivotally mounting the medial portion of said wheel drive housing for steering movements, a wheel hub rotatably mounted on the outer end of said drive housing, means within said housing connecting said hub with a power transmission source, and a power actuated extensible and retractable link pivotally connected at one end to the inner end of said wheel drive housing and at the other end of said base portion of said wheel support beam, whereby application of power to said link controls the steering position of a wheel secured to said hub.

8. In a self propelled, wheel supported vehicle adapted for use over roadless terrain having an elongated bed frame, a quad wheel assembly for supporting a portion of said bed frame comprising:
(1) a primary pivot structure adapted for mounting on said bed frame for pivotal mounting about a horizontal roll axis parallel to said bed frame;
(2) a pair of walking beams respectively pivotally secured to the lateral sides of said pivot structure for movement in a vertical plane about a transverse axis, each of said walking beams being generally truncated W-shaped in a horizontal plane with the pivotal mounting axis passing through the center portion of the W-shape;
(3) means on each end of each W-shaped walking beam for respectively pivotally mounting a medial portion of an elongated wheel drive housing for steering movements;
(4) a wheel hub rotatably mounted on the outer end of each said wheel drive housing, and power transmission means disposed in said housing for rotating said wheel hub, and
(5) a power actuated extensible and retractable link pivotally connected at one end to the inner end of said wheel drive housing and at the other end to the truncated center portion of the respective truncated W-shaped walking beam, whereby the application of power to said link controls the steering position of a wheel secured to said wheel hub.

* * * * *

UNITED STATES PATENT AND TRADEMARK OFFICE
CERTIFICATE OF CORRECTION

PATENT NO. : 4,207,956

DATED : June 17, 1980

INVENTOR(S) : Bruce J. McColl

It is certified that error appears in the above-identified patent and that said Letters Patent are hereby corrected as shown below:

Col. 2, line 50, "is" should be --in--.

Col. 3, line 44, "squad" should be --quad--.

*Signed and Sealed this*

*Twenty-eighth* Day of *October 1980*

[SEAL]

Attest:

SIDNEY A. DIAMOND

*Attesting Officer*　　*Commissioner of Patents and Trademarks*